United States Patent
Shmilovici Leib et al.

(10) Patent No.: US 10,812,391 B1
(45) Date of Patent: *Oct. 20, 2020

(54) METHODS AND APPARATUS FOR LOAD BALANCING IN A NETWORK

(71) Applicant: Marvell Israel (M.I.S.L) Ltd., Yokneam (IL)

(72) Inventors: Zvi Shmilovici Leib, Tel Aviv (IL); David Melman, Halutz (IL); Carmi Arad, Nofit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,725

(22) Filed: Jan. 29, 2018

Related U.S. Application Data

(60) Provisional application No. 62/451,227, filed on Jan. 27, 2017.

(51) Int. Cl.
  *H04L 12/803* (2013.01)
  *H04L 12/26* (2006.01)
  *H04L 12/801* (2013.01)

(52) U.S. Cl.
  CPC ........ *H04L 47/125* (2013.01); *H04L 43/0882* (2013.01); *H04L 47/35* (2013.01)

(58) Field of Classification Search
  CPC .... H04L 47/125; H04L 43/0882; H04L 47/35
  See application file for complete search history.

(56) References Cited

U.S. PATENT DOCUMENTS

| | | | |
|---|---|---|---|
| 7,016,352 B1 | 3/2006 | Chow et al. | |
| 8,223,634 B2 * | 7/2012 | Tanaka | H04L 12/4641 370/229 |
| 8,264,957 B1 * | 9/2012 | Charny | H04L 47/26 370/230 |
| 8,625,594 B2 | 1/2014 | Safrai et al. | |

(Continued)

FOREIGN PATENT DOCUMENTS

| | | |
|---|---|---|
| EP | 0960536 B1 | 8/2003 |
| EP | 1 885 139 | 2/2008 |

(Continued)

OTHER PUBLICATIONS

Chen, "Home Network Basis: Transmission Environments and Wired/Wireless Protocols," Prentice Hall, 26 pages (2006).

(Continued)

*Primary Examiner* — Ian N Moore
*Assistant Examiner* — Rushil Parimal Sampat

(57) ABSTRACT

A local network device receives a plurality of packets via a plurality of network paths in a network system, and counts respective numbers of packets, per network path, that are marked, in Internet Protocol (IP) headers and/or headers corresponding to one or more protocols above an IP layer, to indicate congestion at one or more remote network devices in the network system. The local network device determines respective congestion levels of network paths among the plurality of paths based on the respective numbers of received packets that are marked to indicate congestion at one or more remote network devices in the network system, and performs load balancing operations using at least the respective determined congestion levels.

18 Claims, 4 Drawing Sheets

(56) References Cited

U.S. PATENT DOCUMENTS

| | | | |
|---|---|---|---|
| 8,750,121 | B2 | 6/2014 | Allan |
| 8,804,733 | B1 | 8/2014 | Safrai et al. |
| 9,042,405 | B1 | 5/2015 | Safrai |
| 9,094,337 | B2 | 7/2015 | Bragg et al. |
| 9,258,219 | B1 | 2/2016 | Safrai et al. |
| 9,306,849 | B2 * | 4/2016 | Tripathi .................. H04L 45/66 |
| 9,571,403 | B2 * | 2/2017 | Matthews ........... H04L 47/2441 |
| 9,898,317 | B2 | 2/2018 | Nakil et al. |
| 9,929,961 | B2 | 3/2018 | Luke et al. |
| 10,116,567 | B1 * | 10/2018 | Singh .................... H04L 47/122 |
| 2017/0054591 | A1 * | 2/2017 | Hyoudou ............ H04L 41/0668 |
| 2017/0339062 | A1 | 11/2017 | Mayer-Wolf et al. |
| 2017/0339075 | A1 | 11/2017 | Arad |

FOREIGN PATENT DOCUMENTS

| | | |
|---|---|---|
| EP | 2911352 A2 | 8/2015 |
| WO | WO-2013/082407 | 6/2013 |

OTHER PUBLICATIONS

EEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," The Institute of Electrical and Electronics Engineers, Inc., Sections 1-5, 2695 pages (Dec. 9, 2005).

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation The Institute of Electrical and Electronics Engineers, Inc., 540 pages (May 1, 2002).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.,* 60 pages, (Aug. 17, 2005).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," The Institute of Electrical and Electronics Engineers, Inc., 363 pages (Feb. 10, 2012).

IEEE Std 802.1BR-2012 "IEEE Standard for Local and metropolitan area networks—Virtual Bridged Local Area Networks—Bridge Port Extension," The Institute of Electrical and Electronics Engineers, Inc., 135 pages (May 14, 2012).

IEEE Std 802.1Q—2011 (Revision of IEEE Std.802.1Q-2005), "IEEE Standard for Local and Metropolitan Area Networks—Media Access Control (MAC) Bridges and Virtual Bridged Local Area Networks," The Institute of Electrical and Electronics Engineers, Inc., 1,365 pages (Aug. 31, 2011).

IEEE Std 802.1Q, 2003 Edition, "IEEE Standards for Local and Metropolitan area networks—Virtual Bridged Local Area Networks," The Institute of Electrical and Electronics Engineers, Inc., 327 pages (May 7, 2003).

IEEE Std 802.1Qau, Amendment to IEEE Std 802 1Q-2005,"Virtual Bridged Local Area Networks—Amendment 13: Congestion Notification" The Institute of Electrical and Electronics Engineers, Inc., 135 pages, Apr. 2010.

IEEE Std 802.1Q™—2014 (Revision of IEEE Std.802.1Q-2011), "IEEE Standard for Local and Metropolitan Area Networks—Bridges and Bridged Networks," The Institute of Electrical and Electronics Engineers, Inc., 1,832 pages (Nov. 3, 2014).

IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," The Institute of Electrical and Electronics Engineers, Inc., 379 pages (Mar. 8, 2002).

IEEE Std 802.3-2005 (revision), "IEEE Standard for Information technology—Telecommunications and information exchange between systems—Local and metropolitan area networks—Specific requirements, Part 3: Carrier Sense Multiple Access with Collision Detection (CSMA/CD) access method and physical layer specifications," The Institute of Electrical and Electronics Engineers, Inc., 417 pages (2005).

Ramakrishnan et al., "The Addition of Explicit Congestion Notification (ECN) to IP," Network Working Group, Request for Comments (RFC) 3168, 63 pages (Sep. 2001).

U.S. Appl. No. 15/938,733, Shmilovici et al., "Methods and Apparatus for Load Balancing in a Network,"filed Mar. 28, 2018.

Office Action in U.S. Appl. No. 15/938,733, dated May 30, 2019 (25 pages).

Office Action in U.S. Appl. No. 15/938,733, dated Oct. 17, 2019 (22 pages).

Office Action in U.S. Appl. No. 15/938,733, dated Mar. 30, 2020 (24 pages).

* cited by examiner

METHODS AND APPARATUS FOR LOAD BALANCING IN A NETWORK

CROSS REFERENCES TO RELATED APPLICATIONS

This application claims the benefit of U.S. Provisional Patent Application No. 62/451,227, entitled "Standard L3 Network Load Balancing," filed on Jan. 27, 2017, which is hereby incorporated herein by reference in its entirety.

FIELD OF TECHNOLOGY

The present disclosure relates generally to network communication systems, and more particularly to load balancing within a network communication system.

BACKGROUND

Some networking applications require switching between a very large number of ports. For example, a typical data center includes a large number of servers, and switches to interconnect the servers and to communicatively couple the servers to outside network connections, such as backbone network links. In such applications, switching systems capable of switching between numerous ports are utilized so that traffic can be forwarded between a backbone network line and a large number of servers and/or between each server and a large number of other servers. Such switching systems can include a large number of switches, and each switch typically is capable of switching between several ports. In data centers and server farms, multiple layers of switches are often utilized to enable forwarding packets between each server and a backbone network link and/or between each server and a large number of other servers. For example, a first layer of switches provides ports to which servers and network links are connected. A second layer of switches interconnects the first layer of switches. In some networks, a third layer of switches interconnects the second layer of switches. In some networks, a switching system comprises four or more layers of switches. In such switching systems it is important to balance traffic load among multiple links that are available between switches among the different layers.

SUMMARY

In an embodiment, a method for load balancing in a network system includes: receiving, at a local network device, a plurality of packets via a plurality of network paths; counting, at the local network device, respective numbers of received packets, per network path, that are marked, in Internet Protocol (IP) headers and/or headers corresponding to one or more protocols above an IP layer, to indicate congestion at one or more remote network devices in the network system; determining, at the local network device, respective congestion levels of network paths among the plurality of paths based on the respective numbers of received packets that are marked to indicate congestion; and performing, at the local network device, load balancing operations using at least the respective determined congestion levels at the one or more remote network devices.

In another embodiment, a local network switching device comprises: a plurality of network interfaces configured to communicatively couple to a plurality of network links; and a packet processor. The packet processor includes a plurality of counters configured to count respective numbers of received packets, per network path, that are marked, in Internet Protocol (IP) headers and/or headers corresponding to one or more protocols above an IP layer, to indicate congestion at one or more other remote network switching devices, the plurality of packets having been received via the plurality of network interfaces. The packet processor also includes logic circuitry configured to: determine respective congestion levels for ones of the network paths among the plurality of paths based on respective counts of received packets marked to indicate congestion at one or more other remote network switching devices, the determination of respective congestion levels for the ones of the network paths being based on respective quantities of marked received packets received via the respective network paths; and perform load balancing operations using at least the respective congestion levels.

In yet another embodiment, a method for load balancing in a network switching system includes: receiving, at a local network device, a plurality of packets; determining, at the local network device, based on a first set of two or more of received packets that contain markings indicating congestion at one or more network devices in the network switching system, one or more respective congestion levels of one or more network paths through the network switching system; transmitting, by the local network device, one or more respective indications of the one or more respective congestion levels to one or more other network devices of the network switching system in the one or more respective network paths; selecting, at the local network device, network paths via which a second set of packets are to be forwarded through the network switching system for load balancing; altering, at the local network device, header information in the second set of received packets that are to be forwarded, the altered header information to be used by other network devices in the network switching system use to make network path selections so that the second set of packets are subsequently forwarded responsively to the altered header information along the selected network paths within the network switching system; and transmitting, by the local network device, the second set of packets over selected paths to one or more other network devices in the network switching system.

In still another embodiment, a local network switching device comprises: a plurality of network interfaces configured to communicatively couple to i) one or more external network links, and ii) one or more other network devices within a network switching system; and a packet processor. The packet processor is configured to: determine, based on a first set packets received from one or more network devices in the network switching system that contain markings indicating congestion at one or more network devices in the network switching system, one or more respective congestion levels of one or more network paths through the network switching system; and transmit, via network interfaces among the plurality of network interfaces, one or more respective indications of the one or more respective congestion levels to one or more network devices of the network switching system in the one or more respective network paths. The packet processor includes: a forwarding engine configured to forward received packets to appropriate network interfaces for transmission; path selection circuitry configured to select network paths via which a second set of received packets are to be forwarded through the network switching system for load balancing; and header alteration circuitry configured to alter header information in the second set of received packets that are to be forwarded, the altered header information to be used by other network devices in the network switching system to make network path selections so that the packets are subsequently forwarded along the network paths within the network switching system selected by the path selection circuitry.

DETAILED DESCRIPTION

Embodiments of load balancing methodologies are described herein in the context of load balancing traffic in a hierarchical topology of switching or routing devices as often found in a data center, for example. It is noted however, in light of the disclosure and teachings herein, that similar methods and apparatus for load balancing can be employed in other suitable systems in which multiple links or paths are available for forwarding traffic in a network. The described load balancing methodologies are not limited to use in hierarchical data center topologies, but rather may be utilized in other suitable contexts as well.

Figure 1:
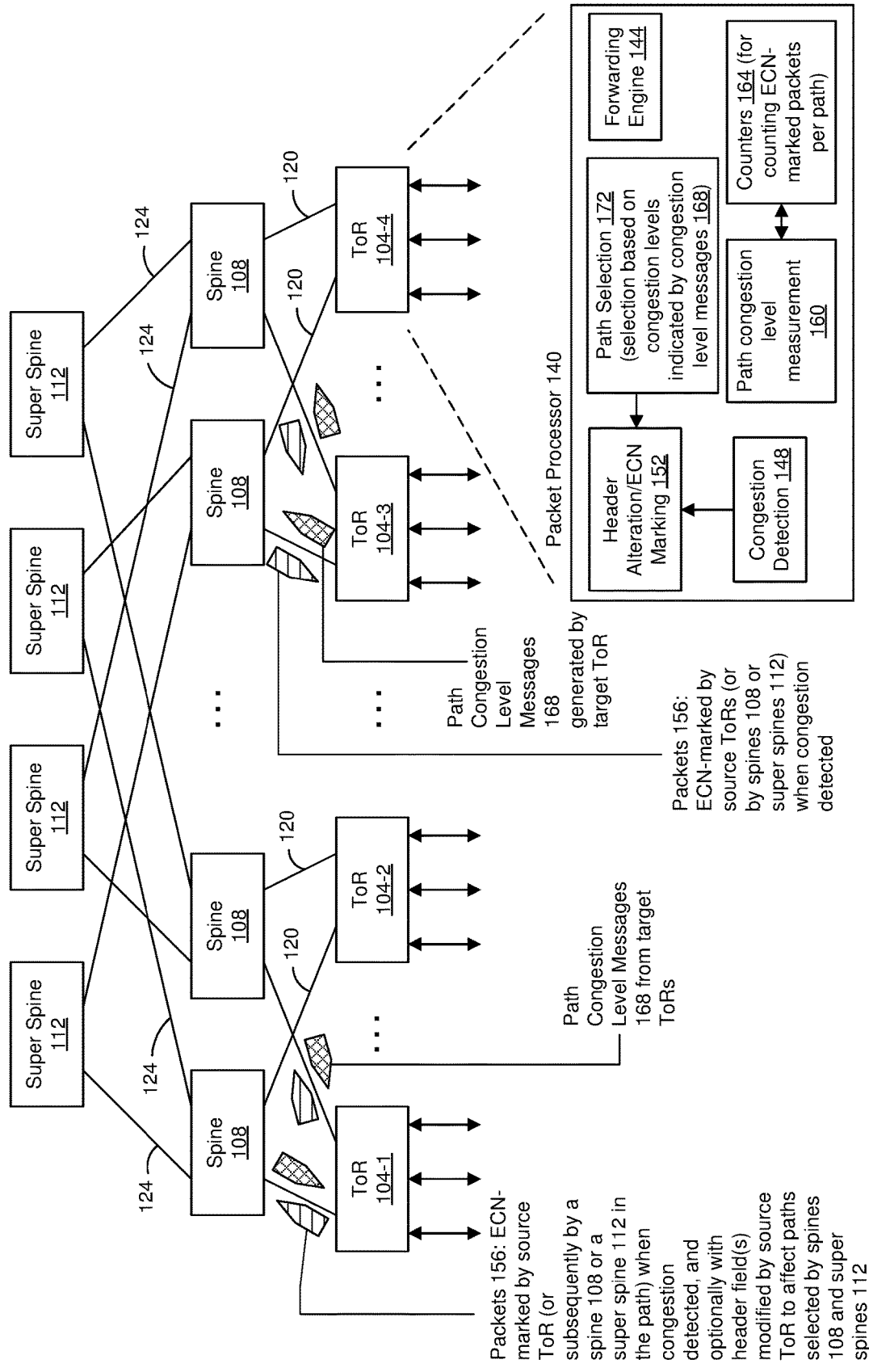
FIG. 1 is a block diagram of an example network switching system that is configured to forward packet through the network switching system along multiple alternative paths, and that selects paths for packets using load balancing operations, according to an embodiment.

FIG. 1 is a block diagram of an example network switching system 100 that utilizes load balancing techniques to efficiently forward traffic over multiple available paths between network devices, according to an embodiment. The network switching system 100 is suitable for use in data centers, server farms, or any other suitable systems that require switching or routing between a large number of network interfaces (e.g., ports), in an embodiment. The network switching system 100 includes a plurality of network devices 104, 108, 112. In the embodiment of FIG. 1, the network devices 104, 108, 112 are arranged in a hierarchical topology. In an example of this topology, the network devices 104, 108, 112 include: a plurality of first-stage switching devices 104, also referred to herein as "top of rack devices" or "ToR devices," a plurality of second-stage switching devices 108, also referred to herein as "spine devices," and a plurality of third-stage switching devices 112, also referred to herein as "super spine devices." The ToR devices, the spine devices 104, and the super spine devices 112 are interconnected via a plurality of network links. In an embodiment, the plurality of network links interconnect each of at least some ToR devices 104 to multiple spine devices 108, and interconnect each of at least some spine devices 108 to multiple super spine devices 112. Similarly, the plurality of network links interconnect each of at least some spine devices 108 to multiple ToR devices 104, and interconnect each of at least some super spine devices 112 to multiple spine devices 108.

In an embodiment, each of at least some ToR devices 104 includes a plurality of downlink network interfaces (not shown) for coupling the ToR device 104 to networks, devices in the networks, servers, storage devices, or other host systems or devices between which network packets are forwarded in the network switching system 100. Each of at least some ToR devices 104 also includes a plurality of uplink network interfaces (not shown) for coupling the ToR device 104 to spine devices 108 via network links 120. Examples of a network interfaces include ports, trunks, virtual ports, etc., and network interfaces are referred to herein as "ports" for ease of explanation.

Each of at least some spine devices 108 includes a plurality of downlink ports (not shown) for coupling the spine device 108 to ToR devices 104 via the network links 120. Additionally, each of at least some spine devices 108 includes a plurality of uplink ports (not shown) for coupling the spine device 108 to super spine devices 112 via the network links 124. Each of at least some super spine devices 112 includes a plurality of ports (not shown) for coupling the super spine device 112 to spine devices 108 via the network links 124.

In an embodiment, the numbers of ToR devices 104, spine devices 108, and super spine devices 112 are generally determined by system requirements. For example, generally, the number of alternative paths available for transmission of data between any two ToR devices 104 is based on the numbers of spine devices 108 and super spine devices 112, in an embodiment. Accordingly, the numbers of spine devices 108 and super spine devices 112 in the network 100 may be selected according to bandwidth requirements for transmission of data between the ToR devices 104, in an embodiment. The number of ToR devices 104 in the network 100, on the other hand, is determined by a number of downlink ports needed by the network switching system 100 for connecting to networks, devices in the networks, servers, storage device, or other host systems or devices, etc., in an embodiment.

When a ToR device 104 receives a packet via a downlink port and is to transmit the packet into the network switching system 100 via an uplink port, the ToR device 104 is acting as a source device or a source ToR, according to an embodiment. On the other hand, when a ToR device 104 receives a packet via an uplink port and is to transmit the packet from the network switching system 100 via a downlink port, the ToR device 104 is acting as a target device or a target ToR, according to an embodiment.

Each of at least some of the ToR devices 104 includes a packet processor 140. The packet processor 140 includes a forwarding engine 144 that is configured to analyze information in a packet (e.g., in a header of the packet, in a tag added to the packet by another network device in the switching system 100, etc.) to determine one or more ports of the ToR device 104 to which the packet is to be forwarded. For example, when a packet is received via one of the downlink ports of the ToR device 104 (e.g., the ToR device 104 is acting as a source ToR), the forwarding engine 144 analyzes one or more of network addresses in a header of the packet to determine to which one or more other ports of the ToR device 104 the packet is to be forwarded for transmission, according to an embodiment. In some embodiments, different uplink ports of the ToR device 104 respectively correspond to multiple alternative network paths to a target ToR. Thus, in some embodiments, when the forwarding engine 144 determines that a packet is to be forwarded to a target ToR, the packet processor 140 uses load balancing techniques to select one of the uplink ports for transmitting the packet.

In some embodiments, a group of ports act as a trunk, each port of the trunk providing an alternative network link to a same destination device. Thus, in some embodiments, the forwarding engine 144 determines that a packet is to be forwarded to a group of ports (or trunk) for transmission, and the packet processor 140 uses load balancing techniques to select one of the ports in the trunk for transmitting the packet.

The forwarding engine 144 includes and/or is coupled to one or more forwarding databases that include associations between network address information and ports of the ToR device 104. In an embodiment, the forwarding engine 144 uses information in the one or more forwarding databases, and information in the header of a packet, to determine a port or a group of ports via which a packet is to be transmitted.

At least some of the ToR devices 104 are configured to ascertain respective congestion levels along different paths through the network switching system 100 based on detection of congestion at other network devices in the switching system, according to an embodiment. For example, at least some network devices in the network switching system 100 are configured to mark selected packets being forwarded through the network switching system 100 with a congestion indication when these network devices detect congestion, as will be described in more detail below. As an illustrative example, at least some network devices in the network switching system 100 are configured to mark selected packets being forwarded through the network switching system 100 according to the Explicit Congestion Notification (ECN) extension to the Internet Protocol (IP) (Network Working Group Request for Comments (RFC) 3168, updated by RFC 4301 and RFC 6040), as will be described in more detail below. At least some of the ToR devices 104, when acting as target ToRs, are configured to measure congestion along different paths through the network switching system 100 based on respective quantities and/or rates of marked packets received by the ToR devices 104 via respective paths, according to an embodiment.

The packet processor 140 includes a congestion detection unit 148 that is configured to detect congestion at uplink ports of the ToR device 104 when the ToR device 104 is acting as a source ToR, according to an embodiment. Congestion at an uplink port of a ToR device 104 implies that one or more paths of the network switching system, passing through the uplink port, are congested. Congestion is detected in any suitable manner. For example, in an embodiment, the congestion detection unit 148 is configured to detect congestion at an uplink port (e.g., when the ToR device 104 is acting as a source ToR) based on one or more respective fill levels of one or more egress queues (not shown) of the ToR device 104, the egress queues corresponding to the uplink port. For example, in response to a fill level of an egress queue corresponding to an uplink port exceeding a threshold, the congestion detection unit 148 determines that there is congestion at the uplink port, according to an embodiment.

In another embodiment, the congestion detection unit 148 is configured to detect congestion at an uplink port of the ToR device 104 (e.g., when the ToR device 104 is acting as a source ToR) in response to congestion messages received from a port of a spine device 108 to which the uplink port of the ToR device 104 is communicatively connected. For example, a packet processor (not shown) of a spine device 108 is configured to i) detect when a fill level of an ingress queue corresponding to a port of the spine device 108 exceeds a threshold, and ii) transmit a congestion notification message to an uplink port of a ToR device 104 to which the port of the spine device 108 is communicatively connected, according to an embodiment. The congestion detection unit 148 in the ToR device 104 then determines there is congestion at the uplink port of the ToR device 104 in response to receiving the congestion notification message from the port of the spine device 108.

When the congestion detection unit 148 detects congestion at an uplink port of the ToR device 104 (acting as a source ToR), the congestion detection unit 148 instructs a header alteration unit 152 to mark a data packet that was received by a downlink port and that will be transmitted by the uplink port to indicate that the ToR device 104 detected congestion, according to an embodiment. In FIG. 1, ToR device 104-1 transmits data packets 156 via uplink ports when acting as a source ToR. When the congestion detection unit 148 detects congestion at an uplink port of the ToR device 104 (acting as a source ToR), a data packet 156 that will be transmitted by the uplink port is marked to indicate that the ToR device 104 detected congestion, according to an embodiment. For example, ECN provides a mechanism for congestion notification, and standard network devices use ECN for rate limiting. For example, when a standard network device is notified of congestion according to ECN, the standard network device rate limits packets, e.g., by dropping packets, until congestion is no longer occurring.

In particular, ECN specifies that the two least significant bits of the DiffSery field in the IP header are set to a particular value to indicate congestion. Thus, in an embodiment, the congestion detection unit 148 instructs the header alteration unit 152 to ECN mark (e.g., set the two least significant bits of the DiffSery field in the IP header to the "Congestion Encountered" value specified by ECN) a data packet that will be transmitted by the uplink port to indicate that the ToR device 104 detected congestion, according to an embodiment. In other embodiments, the congestion detection unit 148 instructs the header alteration unit 152 to mark another suitable field in the IP header, or a header corresponding to a protocol layer above the IP layer in a protocol stack, of a data packet that will be transmitted by the uplink port to indicate that the ToR device 104 detected congestion.

In another embodiment, when the congestion detection unit 148 detects congestion at an uplink port of the ToR device 104 (acting as a source ToR), the congestion detection unit 148 generates a dedicated packet (e.g., a management packet dedicated for measuring congestion levels), marked to indicate that the ToR device 104 detected congestion, for transmission by the uplink port, as opposed to marking a data packet that was received via a downlink port and that will be transmitted via the uplink port. For example, in an embodiment, the congestion detection unit 148 generates a packet that is ECN marked (e.g., the two least significant bits of the DiffSery field in the IP header are set to the "Congestion Encountered" value specified by ECN). In other embodiments, the congestion detection unit 148 generates a packet in which another suitable field in the IP header, or a header corresponding to a protocol layer above the IP layer in a protocol stack, is marked to indicate that the ToR device 104 detected congestion. The dedicated packet is then transmitted by the ToR device 104 via the uplink port at which the congestion detection unit 148 detected congestion.

ECN merely defines a mechanism for notifying whether or not congestion is occurring, e.g., the ECN mechanism merely provides binary information: either there is congestion or there is no congestion. ECN does not define a mechanism for, when there is congestion, measuring a level of the congestion, or for communicating a level of congestion that can have three or more different values.

In some embodiments, packet processors (not shown) of spine devices 108 and/or super spine devices 112 are configured to detect congestion at ports and to mark data packets, or generate dedicated marked packets, when congestion is detected in manners that are the same as or similar to the marking of data packets/generation of dedicated marked packets by source ToR devices discussed above.

In some embodiments, congestion detected at a port of a network device (e.g., a source ToR, a spine device 108, a super spine device 112, etc.) indicates that one or more paths that travel through the port are congested. In other words, a packet marked in a manner such as discussed above indicates that the path along which the packet travelled is congested. Thus, in some embodiments, packet processors (e.g., congestion detection units 148) of ToR devices, spine devices 108, and/or super spine devices 112 are configured to detect congestion along different paths and to mark data packets travelling along paths that the packet processors have detected are congested in a manner the same as or similar to the marking of data packets discussed above. In some embodiments, packet processors (e.g., congestion detection units 148) of ToR devices, spine devices 108, and/or super spine devices 112 are configured to detect congestion along different paths and to generate dedicated marked packets and to transmit the dedicated marked packets along paths that the packet processors have detected are congested in a manner the same as or similar to the generation and transmission of dedicated marked packets discussed above.

A path congestion level measurement unit 160 measures respective congestion levels of a plurality of network paths through the network switching system 100 based on measuring numbers and/or rates of packets received at uplink ports of the ToR device 104 that are marked (by other ToR devices 104 and/or spine devices 108 and/or super spine devices 112) to indicate that other network devices in the network switching system 100 detected congestion. For example, as illustrated in FIG. 1, ToR device 104-3 receives packets 156 via uplink ports of the ToR device 104-3. Some of the packets 156 have been marked by other network devices (e.g., by the ToR device 104-1 acting as a source ToR, and/or by a spine device 108, and/or by a super spine device 112) to indicate that one or more other network devices along the path detected congestion. The path congestion level measurement unit 160 in the ToR device 104-3 maintains respective counts for multiple network paths of marked packets received over respective network paths, where the respective counts indicate respective levels of congestion over the respective network paths. For example, the path congestion level measurement unit 160 is coupled to a plurality of counters 164 and uses the plurality of counters 164 to track respective numbers and/or rates of marked packets (e.g., ECN marked packets) for respective network paths through the network switching system 100, according to an embodiment. The count or rate of marked packets (e.g., ECN marked packets) for a particular network path indicates a congestion level, according to an embodiment.

In an embodiment, the target ToR determines a path by which a marked packet travelled at least based on a source network interface (e.g., a source physical port, a source logical port, a source virtual port, etc.) at which the marked packet arrived at the target ToR. For example, when a packet arrives at a network interface of a ToR, the ToR records an indicator (e.g., a source network interface identifier (ID)) of the network interface in a packet descriptor, for example, corresponding to the packet; the target ToR determines the path by which a marked packet travelled at least based on the source network interface ID stored in the packet descriptor, according to an embodiment.

In another embodiment, the target ToR determines a path by which a marked packet travelled at least based on information included in one or more fields of a header of the packet (e.g., a UDP source port of a VXLAN header, a segment routing label field in an MPLS header etc.).

The path congestion level measurement unit 160 is configured to generate and send path congestion level messages 168 that indicate respective congestions levels for different paths through the network switching system 100 back to source ToRs corresponding to beginning points of the different paths. For example, FIG. 1 illustrates the ToR device 104-3 (acting as a target ToR) transmitting path congestion level messages 168 and the ToR devices 104-1 (acting as a source ToR) receiving path congestion level messages 168. The path congestion level measurement unit 160 transmits a path congestion level message 168 that includes an indication of a congestion level for a particular path to the source ToR at the beginning of the particular path, in an embodiment. Thus, the path congestion level message 168 received by the source ToR informs the source ToR of the congestion level of the particular path (as measured by the target ToR at an end of the path). As will be described in more detail below, the source ToR uses the path congestion level messages 168 for selecting among multiple alternative paths through the network switching system 100 for transmitting packets for purposes of load balancing across the multiple alternative paths, according to an embodiment.

Each of at least some of the ToR devices 104 includes a path selection unit 172 that is configured to select paths through the network switching system 100 for packets being transmitted by the ToR device 104 (acting as a source ToR) via uplink ports of the ToR device 104 based on congestion levels of paths as measured by other ToR devices 104 (acting as target ToRs), according to an embodiment. For example, when a packet can be forwarded through the network switching system 100 via different alternative paths, the path selection unit 172 uses path congestion levels (as indicated by or derived from path congestion level messages 168 received by the ToR device 104) to select one of the different alternative paths for the packet, for example one of the paths that exhibits a relatively low level of congestion. In some embodiments, the path selection decision is made by the path selection unit 172 for a time segment of a packet flow (sometimes referred to herein as a flowlet. In other words, when a path is selected for a flowlet, all packets in the flow are forwarded via the selected path during a time segment of the flow, and a new path selection process may be performed for a next flowlet that occurs after the time segment of the flow (e.g., based on congestion levels as indicated by or derived from path congestion level messages 168 received by the ToR device 104), according to an embodiment. A packet flow corresponds to packets having certain common header information such as a same destination address, a same source address/destination address pair, a same source address/destination address/VLAN tuple, etc., according to an embodiment. A flowlet corresponds to a time segment of the flow preceded and followed by respective gaps in time during which packets in the flow are not received by the network switching system 100, according to an embodiment. The gaps in time have a minimum time duration, according to an embodiment.

In other embodiments, the path selection decision is made by the path selection unit 172 on a packet-by-packet basis.

In some embodiments, selecting a path includes the ToR device 104 (acting as a source ToR) selecting an uplink port from among a set of uplink ports of the ToR device 104, where the ports in the set of uplink ports respectively correspond to different paths through the network switching system 100. In other words, transmitting a packet via different uplink ports of the ToR device 104 causes the packet to travel through the network switching system 100 via different paths, according to some embodiments. Thus, by choosing the uplink port via which the ToR device 104 will transmit a packet, the path selection unit 172 controls (at least partially) the network path via which a packet will travel through the network switching system 100, according to an embodiment.

In some embodiments, selecting a path additionally or alternatively includes the ToR device 104 (acting as a source ToR) causing another network device (e.g., a spine device 108 or a super spine device 112) to select a port from among a set of ports of the other network device for transmitting the packet, where the ports in the set of ports respectively correspond to different paths through the network switching system 100. In other words, transmitting a packet via different ports of the other network device causes the packet to travel through the network switching system 100 via different paths, according to some embodiments. In some embodiments, at least some of the spine devices 108 and/or at least some of the super spine devices 112 include packet processors (not shown) that are configured to select a port for forwarding a packet, from among a plurality of alternative ports that correspond to a plurality of alternative network paths. In some embodiments, packet processors of at least some of the spine devices 108 and/or at least some of the super spine devices 112 apply a hash function to selected fields of a header of the packet, and/or a tag added to the packet, to calculate a hash value. The calculated hash value determines (or at least the spine device 108/super spine device 112 uses the hash value to determine) the particular port, from among the plurality of alternative ports, via which the packet is to be transmitted. Thus, for different values of a particular field in the header or the tag, the spine device 108/super spine device 112 will select a different port from among the plurality of alternative ports, according to an embodiment. The plurality of alternative ports correspond to a trunk, in an embodiment.

In an embodiment, the path selection unit 172 in the ToR device 104 (acting as a source ToR) knows the field(s) of the header and/or the tag (and optionally the hash function(s)) that will be used by spine devices 108/super spine devices 112 (along multiple alternative paths through the network switching system 100) to select ports, from among multiple alternative ports. In an embodiment, the path selection unit 172 controls port selection decisions that will be made by spine devices 108/super spine devices 112 by instructing the header alteration unit 152 to modify one or more of the fields in the header and/or the tag that will be used in the spine devices 108/super spine devices 112 to calculate hash values as discussed above. In this way, the path selection unit 172 controls (at least partially) the network path via which a packet will travel through the network switching system 100, according to an embodiment. In an embodiment, at least some spine devices 108/super spine devices 112 use values of one or more fields of a tunneling protocol header to calculate hash values for selecting alternative ports as discussed above, and the path selection unit 172 instructs the header alteration unit 152 to modify one or more fields in the tunneling protocol header to affect port selection decisions made by at least some spine devices 108/super spine devices 112. For example, in an embodiment, the path selection unit 172 instructs the header alteration unit 152 to modify one or more fields of a Multiprotocol Label Switching (MPLS) header (e.g., an entropy label field in the MPLS header) to affect port selection decisions made by at least some spine devices 108/super spine devices 112.

In another embodiment, at least some spine devices 108/super spine devices 112 additionally or alternatively use values of source port fields of User Datagram Protocol (UDP) headers to calculate hash values for selecting alternative ports as discussed above, and the path selection unit 172 instructs the header alteration unit 152 to modify source port fields in the UDP headers to affect port selection decisions made by at least some spine devices 108/super spine devices 112. In an embodiment, at least some spine devices 108/super spine devices 112 additionally or alternatively use UDP source port fields in Virtual Extensible Local Area Network (VXLAN) header information of a packet to select alternative ports as discussed above, and the path selection unit 172 instructs the header alteration unit 152 to modify UDP source port fields in VXLAN headers to affect port selection decisions made by at least some spine devices 108/super spine devices 112. In another embodiment, at least some spine devices 108/super spine devices 112 additionally or alternatively use segment routing label fields in MPLS header information of a packet to for selecting alternative ports as discussed above, and the path selection unit 172 instructs the header alteration unit 152 to modify segment routing label fields in MPLS headers to affect port selection decisions made by at least some spine devices 108/super spine devices 112.

In other embodiments, the path selection unit 172 in the ToR device 104 (acting as a source ToR) is not configured to instruct the header alteration unit 152 to modify one or more of the fields in the header and/or the tag that will be used in the spine devices 108/super spine devices 112 to calculate hash values as discussed above. In other words, in some embodiments, the ToR device 104 does not modify a header field of a packet for the purpose of affecting port selection decisions that will be made by spine devices 108/super spine devices 112 based on calculating hash values for the packet. Rather, the path selection unit 172 affects the network path via which a packet travels through the switching system 100 by selecting one of a plurality of alternative uplink ports of the ToR device 104 via which the packet is egressed from the ToR device 104 based on congestion levels, as discussed above.

The packet processor 140 comprises one or more logic circuits (e.g., including a hardware state machine) and/or more processors that execute machine readable instructions stored in one or more memory devices, in various embodiments. For example, each of the forwarding engine 144, the congestion detection unit 148, the header alteration unit 152, the path congestion level measurement unit 160, and the path selection unit 172 comprise a logic circuit (e.g., a hardware state machine or other suitable logic circuitry) and/or a processor that execute machine readable instructions stored in a memory device, in various embodiments. Multiple ones of the forwarding engine 144, the congestion detection unit 148, the header alteration unit 152, the path congestion level measurement unit 160, and the path selection unit 172 are implemented using a single processor that executes machine readable instructions, in an embodiment. Respective ones of the forwarding engine 144, the congestion detection unit 148, the header alteration unit 152, the path congestion level measurement unit 160, and the path selection unit 172 are implemented using respective processors that execute machine readable instructions, in an embodiment. The counters 64 comprises one or more counter circuits and one or more memory devices (e.g., multiple registers and/or a memory device with multiple addressable memory locations) for storing counter values, according to an embodiment.

Figure 2:
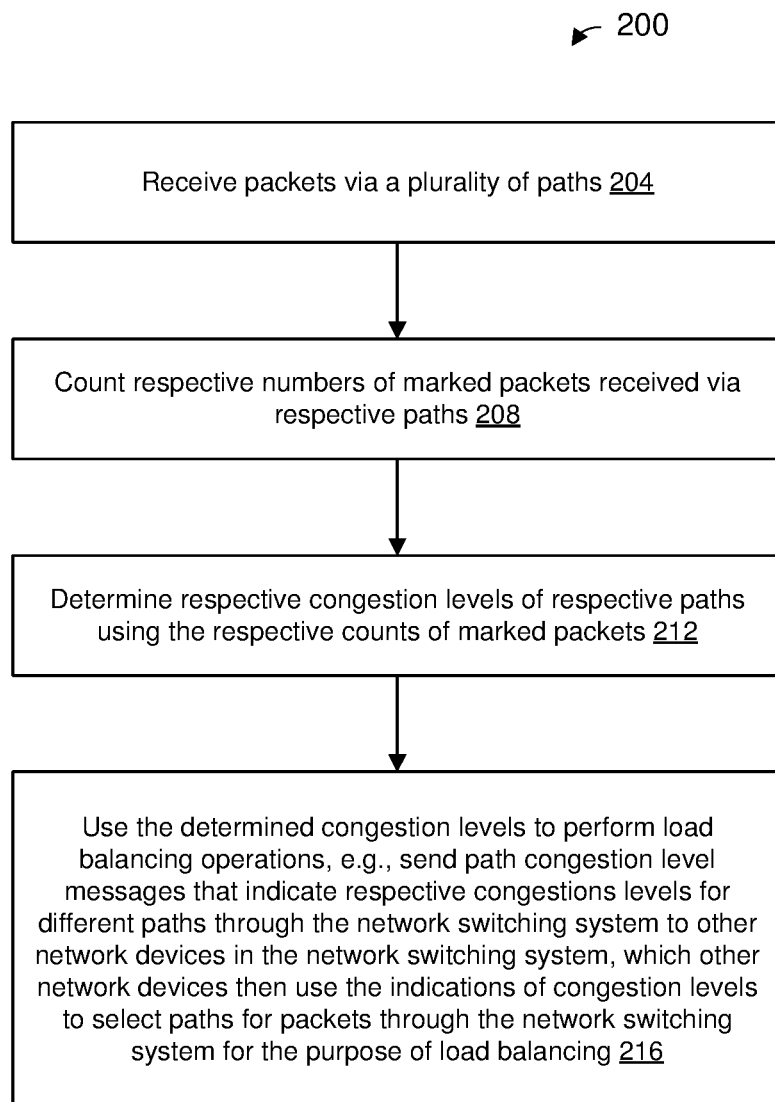
FIG. 2 is a flow diagram of an example method for determining respective congestion levels of alterative paths through a network switching system such as the network switching system of FIG. 1, and using the determined congestion levels to perform load balancing operations, according to an embodiment.

FIG. 2 is a flow diagram of an example method 200 for determining congestion levels of paths in a network switching system and performing load balancing using the congestion levels, according to an embodiment. For example, the method 200 is implemented by a ToR device 104 (acting in its capacity as a target ToR) in the network 100 of FIG. 1, according to an embodiment. More specifically, the method 200 is implemented at least partially by the packet processor 140 (e.g., at least partially by the path congestion level measurement unit 160 and the counters 164), according to an illustrative embodiment. For explanatory purposes, the method 200 is described with reference to FIG. 1. In other embodiments, however, the method 200 is implemented by another suitable network device in another suitable network switching system other than the network switching system 100 of FIG. 1.

At block 204, a network device (acting as a target network device, e.g., a target network device) receives a plurality of packets that have travelled through the network switching system via a plurality of network paths. For example, a ToR device 104 (acting as a target ToR) receives a plurality packets that have travelled through the network switching system 100 via a plurality of network paths.

At block 208, the target network device counts, for each of multiple paths through the network switching system, a respective number of packets that have been marked to indicate congestion in the path (e.g., marked data packets, marked dedicated packets such as management packets dedicated for measuring congestion levels, etc.). In an embodiment the count is an absolute count, while in other embodiments the count corresponds to a particular time period or unit of time. In an embodiment, the target network device identifies packets that are marked, in Internet Protocol (IP) headers and/or headers corresponding to one or more protocols above an IP layer in a protocol stack, to indicate congestion. For example, the target network device identifies packets that are marked according to ECN, in an illustrative embodiment. In another embodiment, the target network device identifies packets that are marked, in headers corresponding to one or more protocols below the IP layer in the protocol stack, to indicate congestion. In another embodiment, the target network device identifies packets that are marked, in a tag added to the packet by the network switching system, to indicate congestion.

As discussed above, other network devices in the network switching system (e.g., network devices other than the target network device) have marked packets when the other network devices detected congestion in the network paths via which the packets are being forwarded through the network switching system, according to an embodiment. For example, source ToRs 104, spine devices 108, and/or super spine devices 112 mark packets when these devices detect congestion, as discussed above, according to various embodiments.

In an embodiment, for packets identified as being marked to indicate congestion, the target network device identifies respective network paths via which the marked packets travelled through the network switching system. Additionally, for a packet marked to indicate congestion and which travelled via a particular path, the target network device increments a count corresponding the particular path. For example, the path congestion level measurement unit 160 maintains respective counters 164 for respective network paths, and increments a particular counter 164 corresponding to a particular path in response to receiving a marked packet that travelled via the particular path. In an embodiment, the path congestion level measurement unit 160 counts, using the particular counter 164, marked packets that were received via the particular path during a time period, and the value of the particular counter 164 at the end of the time period indicates a congestion level for the particular path. In conjunction with the end of the time period, the path congestion level measurement unit 160 resets the particular counter 64 and begins counting marked packets received via the particular path during a new time period, according to an embodiment. More generally, the path congestion level measurement unit 160 counts, using respective counters 164, marked packets indicative of congestion (e.g., marked data packets, marked dedicated packets such as management packets dedicated for measuring congestion levels, etc.) that were received via respective paths during a time period, and the respective values of the respective counters 164 at the end of the time period indicate respective congestion levels for the respective paths, according to an embodiment. In conjunction with the end of the time period, the path congestion level measurement unit 160 resets the counters 64 and begins counting marked packets received via respective paths during a new time period, according to an embodiment.

At block 212, the target network device determines respective congestion levels of respective paths using the respective counts determined at block 208. For example, the path congestion level measurement unit 160 uses the values of respective counters 164 at the end of a time period or unit of time to determine respective congestion levels for respective paths during the time period/unit of time, according to an embodiment. In an embodiment, block 212 includes determining a value of a congestion level indicator corresponding to a path using a value of a counter 164 corresponding to the path. In an embodiment, the value of the congestion level indicator is determined by using a mapping between congestion level indicator values and counter values. For example, the congestion level indicator may have three possible values (e.g., not congested, congested, and very congested), whereas each counter 164 may be configured to reach counts in the hundreds or thousands, according to an embodiment, and thus the mapping indicates how to convert counter values, which may vary between hundreds and thousands of values, to only three congestion level values. In other embodiments, the congestion level indicator may have other suitable numbers of possible values (e.g., two, four, five, six, . . . ) and/or the counters 164 may be configured to reach other suitable numbers of counts (e.g., 32, 64, 128, in the tens of thousands, in the hundreds of thousands, etc.).

In another embodiment, the value of the congestion level indicator is chosen as the counter value at the end of the time period or unit of time.

At block 216, the target network device uses the respective congestion levels determined at block 212 to perform load balancing operations. For example, as discussed above, the path congestion level measurement unit 160 generates and sends path congestion level messages 168 that indicate respective congestions levels for different paths through the network switching system 100 to other network devices in the network switching system 100, and the other network devices use the indications of congestion levels to select paths for packets through the network switching system 100 for the purpose of load balancing, according to an embodiment. The congestion level messages 168 include respective indications of congestions levels, determined at block 212, for respective paths, according to an embodiment. The path congestion level measurement unit 160 sends the path congestion level messages 168 back to source ToRs corresponding to beginning points of the different paths, according to an embodiment. In an embodiment, sending a path congestion level message 168 to another network device (e.g., another ToR device 104) in the network switching system is a load balancing operation because the path congestion level message 168 will affect how the other ToR device 104 (acting as a source ToR) will choose paths for packets through the network switching system.

Figure 3:
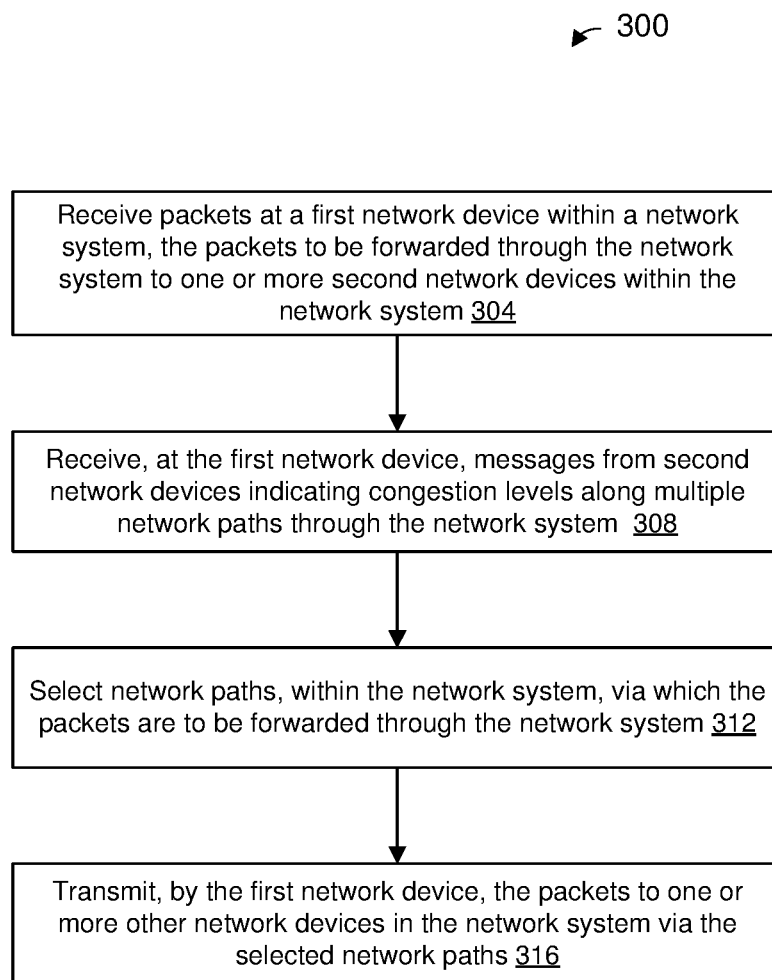
FIG. 3 is a flow diagram of an example method for selecting, at a first network device, paths by which packets are forwarded through a network switching system such as the network switching system of FIG. 1, based on congestion levels determined by second network devices and communicated to the first network device, according to an embodiment.

FIG. 3 is a flow diagram of an example method 300 for performing load balancing in a network switching system comprising a plurality of network devices that includes a first network device and a plurality of second network devices, according to an embodiment. For example, the method 300 is implemented by a ToR device 104 (acting in its capacity as a source ToR) in the network 100 of FIG. 1, according to an embodiment. More specifically, the method 300 is implemented at least partially by the packet processor 140 (e.g., at least partially by the path selection unit 172 and the header alteration unit 152), according to an illustrative embodiment. For explanatory purposes, the method 300 is described with reference to FIG. 1. In other embodiments, however, the method 300 is implemented by another suitable network device in another suitable network switching system other than the network switching system 100 of FIG. 1.

At block 304, the first network device (acting as a source network device) receives packets. For example, a ToR device 104 (acting as a source ToR) receives packets via downlink ports of the ToR device 104. The packets received at block 304 are to be forwarded through the network switching system to one or more of the second network devices (e.g., one or more other ToR devices acting as target ToRs).

At block 308, the first network device receives messages from the plurality of second network devices, the messages indicating congestion levels along multiple network paths through the network switching system. For example, the path selection unit 172 receives path congestion level messages 168 from other ToR devices 104 (acting as target ToRs), the path congestion level messages 168 being indicative of congestion levels along various paths through the network switching system 100. In an embodiment, the path congestion level messages 168 include path congestion level information that was determined by the second network devices based on measuring, at the second network devices, numbers and/or rates of packets received at uplink ports of the second network devices that are marked (by other network devices (e.g., ToR devices and/or spine devices 108 and/or super spine devices 112)) to indicate that other network devices in the network switching system detected congestion. In some embodiments, a packets is marked in a suitable field of an IP header (e.g., ECN-marked), or a header corresponding to a protocol layer above the IP layer in a protocol stack, to indicate congestion along a path that the packet travelled through the network switching system.

At block 312, the source network device determines paths via which packets received at block 304 are to be forwarded through the network switching system. The source network device selects a path, among a group of alternative paths, for a packet to perform load balancing across the group of alternative paths based at least in part upon levels of congestion of the alternative paths as indicated by or derived from path congestion information in the messages received at block 308, according to an embodiment. For example, the path selection unit 172 receives path congestion level messages 168 from other ToR devices 104 (acting as target ToRs), the path congestion level messages 168 being indicative of congestion at various paths through the network switching system 100. The path selection unit 172 selects a path, from among a group of alternative paths, using at least congestion levels derived from the congestion level messages for various paths among the group of alternative paths, according to an embodiment. For example, the path selection unit 172 selects a path, from among the group of alternative paths, that is determined to have a lowest congestion level, in an embodiment. If multiple paths among the group of alternative paths have the same lowest congestion level or similar congestion levels that are less than a congestion threshold, the path selection unit 172 randomly or pseudorandomly selects a path, from among the alternative paths that have the same lowest congestion level or similar low congestion levels, or uses another suitable method to select one of the paths that have the same lowest congestion level or similar low congestion levels, in some embodiments.

In an embodiment, block 312 includes selecting, at a beginning of a flowlet, the path based on congestion levels (as discussed above), and then selecting the same path for subsequent packets in the flowlet without regard to congestion levels. In another embodiment, block 308 includes selecting paths for packets based on congestion levels (as discussed above) on a packet-by-packet basis, thus different paths may be selected for different packets within the same flowlet.

At block 316, the first network device transmits packets received at block 304 along the network paths selected at block 312. In an embodiment, multiple uplink ports of the first network device correspond to multiple alternative network paths through the network switching system to a target network device of the network switching system, and block 316 includes transmitting a packet via one of multiple uplink ports that corresponds to the network path selected at block 312.

Optionally, the method 300 further includes the first network device altering header information in packets (received at block 304), where the altered header information is among header information that other network devices in the network switching system use to make network path selections, wherein the header information is altered so that the packets are forwarded along the network paths, selected at block 312, within the network switching system. In an embodiment, the path selection unit 172 instructs the header alteration unit 152 to alter the header information.

As discussed above, each of at least some other network devices in the network switching system are configured to select a port from among a set of ports for transmitting the packet, where the ports in the set of ports respectively correspond to different alternative paths through the network switching system 100, by applying a hash function to selected fields of a header of the packet, and/or a tag added to the packet, to calculate a hash value. In an embodiment, the path selection unit 172 in the ToR device 104 (acting as a source ToR) knows the field(s) of the header and/or the tag (and optionally the hash function(s)) that will be used by spine devices 108/super spine devices 112 (along multiple alternative paths through the network switching system 100) to select ports, from among multiple alternative ports. Thus, by altering the header information, the path selection unit 172/header alteration unit 152 controls port selection decisions for the packets that will be made by spine devices 108/super spine devices 112, and thus the path selection unit 172/header alteration unit 152 affects the paths along which packets will be forwarded through the network switching system 100.

Optionally, the method 300 includes altering, at the network device, entropy label fields in at least some packets that include Multiprotocol Label Switching (MPLS) headers, wherein other network devices in the network switching system use the entropy label fields to make network path selection decisions. In an embodiment, method 300 includes altering User Datagram Protocol (UDP) source port fields in at least some packets that include Virtual Extensible Local Area Network (VXLAN) header information, wherein other network devices in the network switching system use the UDP source port fields to make network path selection decisions. In other embodiments, the method 300 includes altering other suitable header fields that other network devices in the network switching system use to make network path selection decisions.

In an embodiment, block 316 optionally includes the first network device transmitting packets, the headers of which were altered as discussed, to one or more other network devices in the network switching system. For example, after altering header information of packets received via downlink ports, the source ToR transmits packets to one or more spine devices 108 via one or more uplink ports. As a result of the alteration of the headers and/or transmission by the first network device via particular uplink ports, other devices in the network switching system (e.g., spine devices 108 and/or super spine devices 112) will forward the packets along paths selected by the source network device at block 312.

Figure 4:
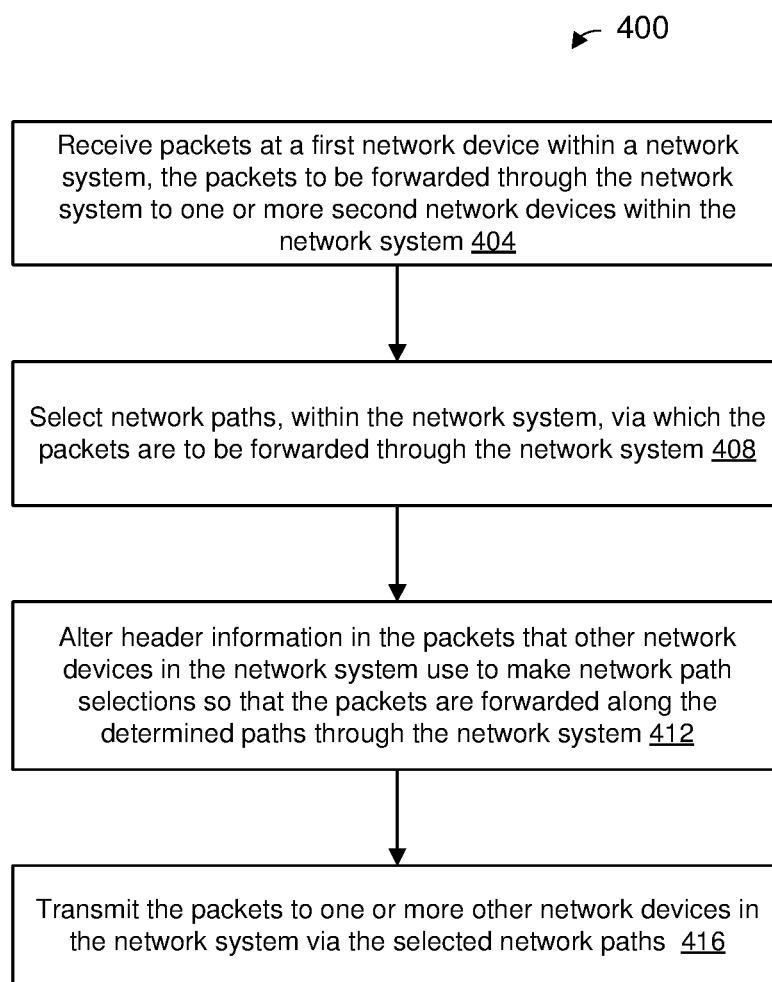
FIG. 4 is a flow diagram of an example method for controlling the paths by which packets are forwarded through a network switching system such as the network switching system of FIG. 1, by altering fields in headers of the packets, according to an embodiment.

FIG. 4 is a flow diagram of an example method 400 for performing load balancing in a network switching system comprising a plurality of network devices that includes a first network device and a plurality of second network devices, according to an embodiment. For example, the method 400 is implemented by a ToR device 104 (acting in its capacity as a source ToR) in the network 100 of FIG. 1, according to an embodiment. More specifically, the method 400 is implemented at least partially by the packet processor 140 (e.g., at least partially by the path selection unit 172 and the header alteration unit 152), according to an illustrative embodiment. In some embodiments, a device (e.g., a ToR device) in a network system implements the method 400 as well as embodiments of other techniques described herein, such as the method 200 of FIG. 2 and/or the method 300 of FIG. 3. In other embodiments, however, a device (e.g., a ToR device) in a network system implements the method 400 but does not implement embodiments of other techniques described herein.

For explanatory purposes, the method 400 is described with reference to FIG. 1. In other embodiments, however, the method 400 is implemented by another suitable network device in another suitable network switching system other than the network switching system 100 of FIG. 1.

At block 404, the first network device (acting as a source network device) receives packets. For example, a ToR device 104 (acting as a source ToR) receives packets via downlink ports of the ToR device 104. The packets received at block 404 are to be forwarded through the network switching system to one or more of the second network devices (e.g., one or more other ToR devices acting as target ToRs).

At block 408, the first network device determines paths via which packets received at block 404 are to be forwarded through the network switching system. The source network device selects a path, among a group of alternative paths, for a packet to perform load balancing across the group of alternative paths based at least in part upon determined levels of congestion of the alternative paths, according to an embodiment. For example, the path selection unit 172 receives path congestion level messages 168 from other ToR devices 104 (acting as target ToRs), the path congestion level messages 168 being indicative of congestion along various paths through the network switching system 100. The path selection unit 172 selects a path, from among a group of alternative paths, using at least congestion levels determine or derived from the congestion level messages for various paths among the group of alternative paths, according to an embodiment. For example, the path selection unit 172 selects a path, from among the group of alternative paths, that is determined to have a lowest congestion level, in an embodiment. If multiple paths among the group of alternative paths have the same lowest congestion level or similar congestion levels that are less than a congestion threshold, the path selection unit 172 randomly or pseudo-randomly selects a path, from among the alternative paths that have the same lowest congestion level or similar low congestion levels, or uses another suitable method to select one of the paths that have the same lowest congestion level or similar low congestion levels, in some embodiments.

In an embodiment, block 408 includes selecting, at a beginning of a flowlet, the path based on congestion levels (as discussed above), and then selecting the same path for subsequent packets in the flowlet without regard to congestion levels. In another embodiment, block 408 includes selecting paths for packets based on congestion levels (as discussed above) on a packet-by-packet basis, thus different paths may be selected for different packets within the same flowlet.

At block 412, the source network device alters header information in packets (received at block 404), where the altered header information is among header information that other network devices in the network switching system use to make network path selections. Block 412 includes altering the header information so that the packets are forwarded along the network paths, determined at block 408, within the network switching system. In an embodiment, the path selection unit 172 instructs the header alteration unit 152 to alter the header information.

As discussed above, each of at least some other network devices in the network switching system are configured to select a port from among a set of ports for transmitting the packet, where the ports in the set of ports respectively correspond to different alternative paths through the network switching system 100, by applying a hash function to selected fields of a header of the packet, and/or a tag added to the packet, to calculate a hash value. In an embodiment, the path selection unit 172 in the ToR device 104 (acting as a source ToR) knows the field(s) of the header and/or the tag (and optionally the hash function(s)) that will be used by spine devices 108/super spine devices 112 (along multiple alternative paths through the network switching system 100) to select ports, from among multiple alternative ports. Thus, by altering the header information at block 412, the path selection unit 172/header alteration unit 152 controls port selection decisions for the packets that will be made by spine devices 108/super spine devices 112, and thus the path selection unit 172/header alteration unit 152 affects the paths along which packets will be forwarded through the network switching system 100.

In an embodiment, block 412 includes altering, at the first network device, entropy label fields in at least some packets that include Multiprotocol Label Switching (MPLS) headers, wherein other network devices in the network switching system use the entropy label fields to make network path selection decisions. In an embodiment, block 412 includes altering User Datagram Protocol (UDP) source port fields in at least some packets that include Virtual Extensible Local Area Network (VXLAN) header information, wherein other network devices in the network switching system use the UDP source port fields to make network path selection decisions. In other embodiments, block 412 includes altering other suitable header fields that other network devices in the network switching system use to make network path selection decisions.

At block 416, the first network device transmits packets, the headers of which were altered at block 412, to one or more other network devices in the network switching system. For example, after altering header information of packets received via downlink ports, the source ToR transmits packets to one or more spine devices 108 via one or more uplink ports. As a result of the alteration of the headers (at block 412), other devices in the network switching system (e.g., spine devices 108 and/or super spine devices 112) will forward the packets along paths selected by the source network device at block 408.

At least some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for load balancing in a network switching system having i) a first network device and ii) multiple other network devices including a second network device, the method comprising:
receiving, at the first network device, a plurality of packets via a plurality of network paths within the network switching system, the plurality of packets including a subset of received packets that have been marked within each received packet in the subset by one or more of the other network devices in the network switching system to indicate congestion at the one or more other network devices, wherein the subset of packets have been marked in respective Internet Protocol (IP) headers within respective received packets in the subset to indicate congestion;
counting, at the first network device, respective numbers of received packets, per network path, that have been marked in respective IP headers within respective received packets to indicate congestion by the one or more other network devices;
determining, at the first network device, respective congestion levels of network paths among the plurality of paths based on the counting of respective numbers of received packets that are marked in respective IP headers within respective received packets to indicate congestion at the one or more other network devices; and
transmitting, by the first network device, indications of the respective congestion levels to multiple ones of the other network devices in the network switching system to affect path selection decisions for packets forwarded through the network switching system made by the multiple ones of the other network devices in accordance with load balancing operations, including transmitting a subset of the indications of the respective congestion levels to the second network device in the network switching system for the second network device to use the subset of indications of the respective congestion levels to load balance packets, forwarded into the network switching system by the second network device, across multiple alternative network paths communicatively coupled to the second network device.

2. The method of claim 1, wherein:
counting respective numbers of received packets that are marked to indicate congestion comprises counting respective numbers of received packets that are marked to indicate congestion, per network path, during respective time periods.

3. The method of claim 1, wherein:
counting respective numbers of received packets that are marked to indicate congestion comprises counting respective numbers of received packets that are marked to indicate congestion, per network path, during a unit of time.

4. The method of claim 1, further comprising:
recording, at the first network device, indicators of ingress network interfaces of the first network device at which received packets, that are marked to indicate congestion, arrived at the first network device; and
determining, at the first network device, network paths via which received packets, that are marked to indicate congestion, arrived at the first network device using the indications of the ingress network interfaces corresponding to the packets that are marked to indicate congestion.

5. The method of claim 1, further comprising:
determining, at the first network device, network paths via which received packets, that are marked to indicate congestion, arrived at the first network device using information in one or more header fields of the packets.

6. The method of claim 1, wherein counting respective numbers of received packets that are marked to indicate congestion comprises:
counting, at the first network device, respective numbers of received packets, per network path, that are marked according to an Explicit Congestion Notification (ECN) extension to an IP and/or an ECN extension to a Transmission Control Protocol (TCP).

7. The method of claim 1, wherein determining respective congestion levels of network paths comprises:

using a mapping to map respective numbers of received packets that are marked to indicate congestion to respective values of respective congestion level indicators.

8. The method of claim 1, wherein determining respective congestion levels of network paths comprises:

selecting respective congestion levels as the respective numbers of packets that are marked to indicate congestion.

9. The method of claim 1, further comprising:

using, at the second network device, the subset of indications of the respective congestion levels to load balance packets, forwarded into the network switching system by the second network device, across the multiple alternative network paths communicatively coupled to the second network device.

10. A first network switching device within a network switching system having multiple other network devices including a second network switching device, the first network switching device comprising:

a plurality of network interfaces configured to communicatively couple to a plurality of network paths within the network switching system and to receive a plurality of packets via the plurality of network paths including a subset of received packets that have been marked by one or more of the other network devices in the network switching system to indicate congestion at the one or more other network devices, wherein the subset of packets have been marked in respective Internet Protocol (IP) headers within respective received packets in the subset to indicate congestion;

a packet processor including a plurality of counters configured to count respective numbers of received packets, per network path, that have been marked in respective IP headers within respective received packets to indicate congestion by the one or more other network devices;

wherein the packet processor also includes logic circuitry configured to:

determine respective congestion levels for network paths among the plurality of paths based on respective counts of received packets marked in respective IP headers within respective received packets to indicate congestion at the one or more other network switching devices, the determination of respective congestion levels for the network paths being based on respective quantities of marked received packets received via the respective network paths, and transmit, via the plurality of network interfaces, indications of the respective congestion levels to multiple ones of the network devices in the network switching system to affect path selection decisions for packets forwarded through the network switching system made by the multiple ones of the other network devices in accordance with load balancing operations, including transmitting a subset of the indications of the respective congestion levels to the second network switching device in the network switching system for the second network switching device to use the subset of indications of the respective congestion levels to load balance packets, forwarded into the network switching system by the second network switching device, across multiple alternative network paths communicatively coupled to the second network switching device.

11. The first network switching device of claim 10, wherein the plurality of counters is configured to:

count respective numbers of received packets that are marked to indicate congestion, per network path, during respective time periods.

12. The first network switching device of claim 10, wherein the plurality of counters is configured to:

count respective numbers of received packets that are marked to indicate congestion, per network path, during a unit of time.

13. The first network switching device of claim 10, wherein the logic circuitry is further configured to:

record indicators of ingress network interfaces, among the plurality of network interfaces, at which received packets, that are marked to indicate congestion, arrived at the first network switching device; and determine network paths via which received packets, that are marked to indicate congestion, arrived at the first network switching device using the indications of the ingress network interfaces corresponding to the received packets that are marked to indicate congestion.

14. The first network switching device of claim 10, wherein the logic circuitry is further configured to:

determine network paths via which received packets, that are marked to indicate congestion, arrived at the first network switching device using information in one or more header fields of the received packets.

15. The first network switching device of claim 10, wherein the plurality of counters is configured to:

count respective numbers of received packets, per network path, that are marked according to an Explicit Congestion Notification (ECN) extension to an IP and/or an ECN extension to a Transmission Control Protocol (TCP).

16. The first network switching device of claim 10, wherein the logic circuitry is further configured to:

determine respective congestion levels based on a mapping of quantities of counted received packets that are marked to indicate congestion to respective values of corresponding congestion levels.

17. The first network switching device of claim 10, wherein the logic circuitry is further configured to:

select respective congestion levels as the respective counts of received packets marked to indicate congestion.

18. A system comprising the first network switching device of claim 10, wherein:

the system further comprises the multiple other remove network devices;

the packet processor of the first network switching device is a first packet processor;

the second network switching device includes a second packet processor configured to:

use the subset of indications of the respective congestion levels to load balance packets, forwarded into the network switching system by the second network switching device, across multiple alternative network paths among the plurality of network paths within the network switching system.

* * * * *